US011880297B2

(12) United States Patent
Bragdon et al.

(10) Patent No.: US 11,880,297 B2
(45) Date of Patent: *Jan. 23, 2024

(54) CODELESS LOGGING IN AN INTEGRATION PLATFORM

(71) Applicant: salesforce.com, inc., San Francisco, CA (US)

(72) Inventors: Andrew Craig Bragdon, Brentwood, CA (US); Ignacio Agustin Manzano, Buenos Aires (AR); Agustin Lopez Gabeiras, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,632

(22) Filed: Sep. 27, 2022

(65) Prior Publication Data
US 2023/0116130 A1 Apr. 13, 2023

Related U.S. Application Data

(63) Continuation of application No. 16/389,783, filed on Apr. 19, 2019, now Pat. No. 11,467,950.

(51) Int. Cl.
*G06F 11/36* (2006.01)
*G06F 11/34* (2006.01)
*G06F 8/20* (2018.01)

(52) U.S. Cl.
CPC ............ *G06F 11/3692* (2013.01); *G06F 8/20* (2013.01); *G06F 11/3476* (2013.01); *G06F 11/3612* (2013.01); *G06F 11/3636* (2013.01)

(58) Field of Classification Search
CPC . G06F 11/3612; G06F 11/3636; G06F 11/366
See application file for complete search history.

(56) References Cited

U.S. PATENT DOCUMENTS 6,167,409 A 12/2000 DeRose et al.
8,818,961 B1 8/2014 Beatty et al.
(Continued)

OTHER PUBLICATIONS

Supasak Kulawonganunchai, Mashupsheet A Web Integration Platform for Interactive Visualization Applications, Master's Thesis, 76 pages (Year: 2009).
(Continued)

*Primary Examiner* — Duy Khuong T Nguyen
(74) *Attorney, Agent, or Firm* — Sterne, Kessler, Goldstein & Fox P.L.L.C.

(57) ABSTRACT

Disclosed herein are system, method, and device embodiments for implementing dynamic codeless logging in an integration platform system. An integration platform may provide a declaratively-configurable asset pre-configured to implement a logging functionality associated with a log point, package the declaratively-configurable asset within an integration application, and receive a selection of the log point associated with the declaratively-configurable asset. In addition, the integration application may generate log information corresponding to the log point based on the selection of the log point and the logging functionality. Further, the integration platform may present the log information within a graphical user interface.

20 Claims, 7 Drawing Sheets

(56) References Cited

U.S. PATENT DOCUMENTS

| | | | |
|---|---|---|---|
| 10,698,756 | B1 | 6/2020 | Abdelsalam et al. |
| 10,756,959 | B1 * | 8/2020 | Makwarth ............... H04L 41/22 |
| 10,836,851 | B2 | 11/2020 | Ker et al. |
| 11,467,950 | B2 | 10/2022 | Bragdon et al. |
| 2006/0230348 | A1 | 10/2006 | Fahmy |
| 2007/0130320 | A1 | 6/2007 | Morgan et al. |
| 2007/0157179 | A1 | 7/2007 | Seeger et al. |
| 2008/0141226 | A1 | 6/2008 | Girouard et al. |
| 2009/0177929 | A1 | 7/2009 | Sijelmassi |
| 2010/0169867 | A1 | 7/2010 | Wegmann |
| 2011/0307233 | A1 | 12/2011 | Tseng et al. |
| 2014/0258970 | A1 | 9/2014 | Brown et al. |
| 2015/0039732 | A1 | 2/2015 | Mall et al. |
| 2016/0378439 | A1 | 12/2016 | Straub et al. |
| 2018/0157468 | A1 | 6/2018 | Stachura |
| 2018/0181378 | A1 | 6/2018 | Bakman |
| 2020/0092178 | A1 | 3/2020 | Nelson et al. |
| 2020/0125336 | A1 | 4/2020 | Mills et al. |
| 2020/0334135 | A1 | 10/2020 | Bragdon et al. |
| 2022/0405197 | A1 | 12/2022 | Bragdon et al. |
| 2023/0091664 | A1 | 3/2023 | Bragdon et al. |

OTHER PUBLICATIONS

Istvan Rath, Declarative Specification of Domain Specific Visual Languages, Master's Thesis, 129 pages (Year: 2006).

* cited by examiner

CODELESS LOGGING IN AN INTEGRATION PLATFORM

CROSS REFERENCE TO RELATED APPLICATION

This application is a continuation of U.S. application Ser. No. 16/389,783, filed Apr. 19, 2019, which is related to U.S. patent application Ser. No. 16/389,778 by Bragdon, et al., "Log Tokenization In An Integration Platform," the contents of which are all incorporated herein by reference.

BACKGROUND

An integration platform may allow an organization to design, implement, and deploy software systems that integrate and harness resources from across an organization's technical landscape. Such resources may include applications, services, and data sources regardless of the operating systems, programming languages, data types, and other differences in the system resources. An integration platform may include functional components to design integration applications, retrieve and transform data, interact with various application programming interfaces (APIs), deploy integration applications to users, and otherwise maintain such applications.

Often, development of an integration application requires writing, testing, building, and maintaining significant amounts of logging and/or diagnostic code that is largely boilerplate, inefficient, difficult to maintain, and frequently a source of software bugs and security issues. Further, logging code and diagnostic code is rarely integrated with visualization tools or centralized software management policies. As such, logging and diagnostic code often presents many challenges throughout the software development cycle, especially to developers endeavoring to improve the efficiency and usability of an integration application via data-driven design.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing dynamic codeless logging in an integration platform.

Figure 1:
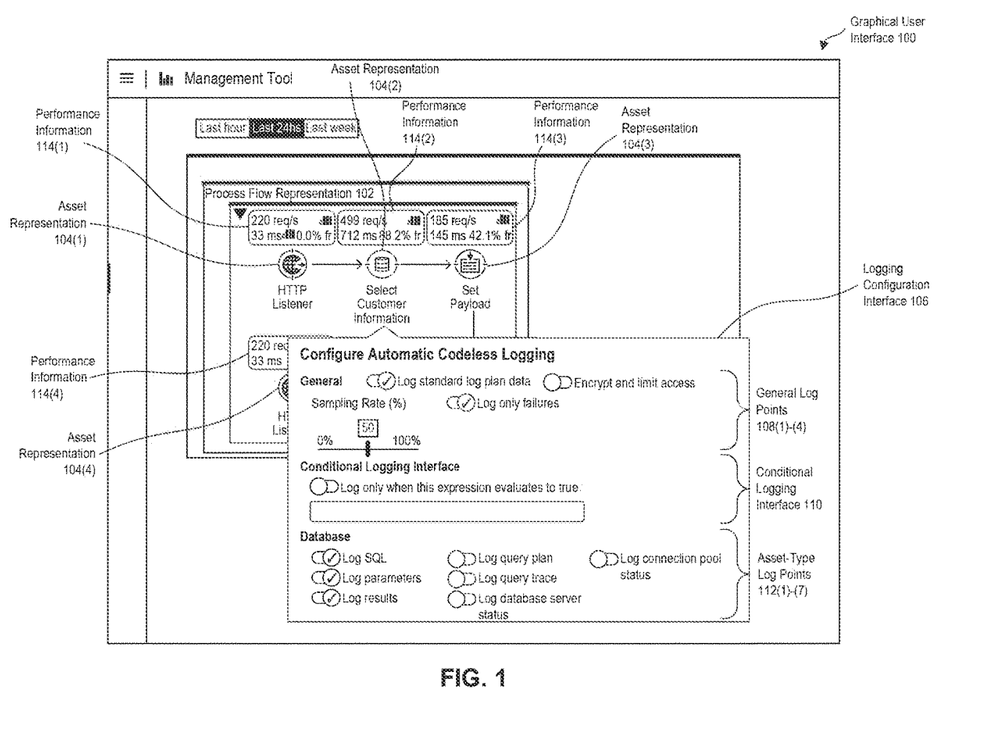
FIG. 1 illustrates an example graphical user interface of a management application for implementing dynamic codeless logging on an integration platform, according to some embodiments.

FIG. 1 illustrates an example graphical user interface (GUI) of a management application for implementing dynamic codeless logging on an integration platform, according to embodiments of the present disclosure. Referring to FIG. 1, the GUI 100 provides application information corresponding to activity of an integration application developed on the integration platform. As used herein, and in some embodiments, an "integration platform" may refer to a software platform that may be employed to integrate a plurality of software applications and/or services. In some examples, the integration platform may incorporate at least one of an enterprise service bus (ESB) architecture, a micro-service architecture, or a service oriented architecture (SOA). As used herein, and in some embodiments, an "integration application" may refer to an application developed and/or executed using an integration platform. For instance, the integration application may include one or more pre-built components of the integration platform. In addition, the integration application may be declaratively developed using an integration-application design tool of the integration platform, deployed within a runtime environment of the integration platform, and/or executed within the integration platform as a service (iPaaS).

As used herein, and in some embodiments, a "management application" may refer to an application or service for managing and/or monitoring execution of an integration application. As described herein, a management application may display application attributes, application settings, application details, performance metrics (e.g., flow analysis information), and/or application activity (e.g., log information) in near-real time or real-time via a GUI (e.g., the GUI 100). In addition, the management application may display historic application attributes, historic application details, and/or historic application activity via a GUI (e.g., the GUI 100). Further, the management application may permit a platform user (e.g., administrator, developer, etc.) to dynamically modify application attributes and/or application settings during execution of an integration application associated with the management application.

Suppose the management application presents the GUI 100 with respect to an integration application that provides customer relationship management functionalities. For instance, the integration application may be configured to receive a customer information request, query a database for the customer information based on an identifier included in the customer information request, prepare a payload message including the requested customer information, and send the payload message to the requestor. The management application may be configured to display one or more process flows of the integration application, and permit a platform user to enable or disable dynamic codeless logging of operations performed by the assets of the one or more process flows during execution of the integration application.

As used herein, and in some embodiments, "a process flow" may be a construct within which a developer links together several individual assets to handle the receipt, processing, and eventual routing of a message. Further, a developer may connect process flows together to build an integration application that may be deployed within a runtime environment. As described herein, a process flow may include one or more assets or process sub-flows, and define a single repeatable process within the integrated application. In some embodiments, process flows and process sub-flows are integration application components for grouping together a sequence of assets and/or operations to help automate integration processes.

Each asset of a process flow receives an input message, carries out a specific function, and then transfers an output message to the next component (e.g., the next asset) of the process flow. As such, the placement and order of assets within a process flow determines the functionality of the corresponding integration application. In some embodiments, an integration application may be a single process flow, or a collection of discrete process flows and process sub-flows that interact with each other. For instance, an integration application may implement multiple process flows and process sub-flows to divide an integration application into functional modules and/or for error-handling purposes.

As illustrated in FIG. 1, the GUI 100 may include a flow representation 102. Although a single flow representation 102 is shown in FIG. 1, the embodiments described herein are applicable to any number of flow representations. Further, each flow representation may correspond to a process flow within the integration application. In some embodiments, the flow representation may depict the process flows, process sub-flows, and/or assets of an integration application. For example, the flow representation 102 may correspond to a process flow for requesting customer information from the integration application. In addition, the flow representation 102 may include one or more assets representations 104 corresponding to the assets of the process flow.

For instance, the process flow representation 102 may include the assets representations 104(1)-(4). Although asset representations 104(1)-(4) are shown in FIG. 1, the embodiments described herein are applicable to any number of asset representations. The asset representation 104(1) may correspond to a HTTP endpoint asset configured to receive a HTTP request for customer information, the asset representation 104(2) may correspond to an asset configured to query a customer database for customer information based on an customer identifier included in the HTTP request, the asset representation 104(3) may correspond to an asset configured to set the payload of a message to include the customer information, and the asset representation 104(4) may correspond to a represent a HTTP endpoint configured to send a HTTP response including the message. In some embodiments, the asset representation 104(1) and the asset representation 104(4) may correspond to the same HTTP endpoint.

In addition, the GUI 100 may present a logging configuration interface 106. In some embodiments, a platform user of the management application may select an asset representation 104 via the GUI 100, and the GUI 100 may present the logging configuration interface 106 in response to the selection. For instance, the user may select the asset representation 104(2) via an input device (e.g., a mouse, a keyboard, touch screen interface, etc.) and present the logging configuration interface 106 with respect to the asset representation 104(2).

Further, the logging configuration interface 106 may include general log points 108, a conditional logging interface 110, and asset-type log points 112. As used herein, and in some embodiments, a "log point" may refer to a type of loggable event or context that may occur during execution of an integration application. Further, in some embodiments, the management application may be used to declaratively program an integration application to log information associated with a log point before and/or during execution of the integration application. As used herein, and in some embodiments, a "loggable event" may be an action or occurrence recognized by the integration application. In addition, as used herein, and in some embodiments, a "loggable context" may be a state of an integration application. In some embodiments, the state of an integration application may include variable information, constant information, scope information, stack information, trace flow information, debug information, version information, etc.

As described in detail herein, the individual assets may log application information corresponding to their individual functions. In some embodiments, the assets may be pre-configured to log application information in response to user input to the logging configuration interface 106. For example, in response to a user selecting a log point via the logging configuration interface 106, the management application may cause the asset associated with the presented instance of the logging configuration interface 106 to log application information associated with the log point to a log file associated with the integration application. As illustrated in FIG. 1, each log point within the logging configuration interface 106 may be presented with a selectable and deselectable graphical control element (e.g., radio button, checkbox, slider control, drop-down list, etc.) for enabling or disabling logging by an asset in accordance with the log point while the integration application is executing.

The general log points 108 may include log points generic to a plurality of assets within the integration platform. In some embodiments, the general log points 108 may enable or disable logging of version information, usage information, user input information, input output (I/O) event information, application errors, application exceptions, application failures, application successes, debug information, trace flow information, incoming event messages, incoming payloads, incoming properties, outgoing event messages, outgoing payloads, outgoing properties, etc.

In some embodiments, the logging configuration interface 106 may further include a control for implementing encryption and access control with respect to individual log points or a plurality of log points. For instance, the control may be employed to restrict log information generated in accordance with a log point to consumption by a particular platform user, group of platform users, department of platform users, organization of platform users, etc. In some embodiments, access control may be implemented by encrypting the log information, and limiting access to a decryption key for decrypting the log information to authorized users.

In addition, the general log points 108 may include a sampling rate control for determining a frequency of acquisition of application information to analyze for loggable events or loggable contexts. Further, the user may select at least one of the general log points 108 before or during execution of an integration application.

For example, a user may activate the log point 108(3) corresponding to an application failure associated with the asset corresponding to the asset representation 104(2) while the integration application executes. In response, the management application may send a command to the integration application to log any application failures by the asset corresponding to the asset representation 104(2). In response, the executing integration application may log application failures by the asset corresponding to the asset representation 104(2) without a developer having to modify the code of the integration application or restart the integration application.

In addition, the platform user may subsequently deactivate the log point 108(3) corresponding to application failure associated with the asset corresponding to the asset representation 104(2) while the integration application executes. In response, the management application may send a command to the integration application to suspend logging application failures by the asset corresponding to the asset representation 104(2). In response, the executing integration application may abstain from logging application failures by the asset corresponding to the asset representation 104(2) without a developer having to modify the code of the integration application or restart the integration application.

Additionally, the conditional logging interface 110 may be configured to receive user input identifying when the asset corresponding to the asset representation 104(2) should log information corresponding to the log points of the logging configuration interface 106. In some embodiments, the user input may include an expression that may evaluate to true or false. Further, when the conditional logging interface 110 is enabled, the management application may send a command to the integration application to log information corresponding to the log points of the logging configuration interface 106 only when the expression evaluates to true. In response, the asset corresponding to the asset representation 104(2) may only log information corresponding to the log points of the logging configuration interface 106 when the expression evaluates to true without a developer having to modify the code of the integration application or restart the integration application.

Further, the asset-type log points 112 may include one or more log points specific to a function or attribute of an asset. For example, if an asset is associated with a database (e.g., a SQL database), the asset-type log points 112 may enable or disable logging of database commands and/or operations (SQL operations and/or commands) performed by the asset, database parameters of a database associated with the asset, query plans associated with queries performed by the asset, query results associated with queries performed by the asset, query response times for queries performed by the asset, query traces for queries performed by the asset, a database server status of a database associated with the asset, etc.

In some embodiments, the management application may determine the asset-type log points 112 of the logging configuration interface 106 based on one or more asset-types associated with the selected asset representation 102. For instance, if a user selects an asset representation 102 associated with an asset for connecting to a structured query language (SQL) database, the management application may determine that the selected asset representation 102 is associated with an asset related to SQL databases, and present the logging configuration interface 106 with general log points 108 common to a plurality of assets, and asset-type log points 112 specific to SQL database assets or database management system (DBMS) specific assets.

In some embodiments, the logging configuration interface 106 may further include a control for implementing log tokenization with respect to the individual log points. Log tokenization is not the focus of this disclosure, but is described in more detail in co-pending application "Log Tokenization In An Integration Platform," which is incorporated by reference herein in its entirety.

Further, the management application may provide real-time or near real-time performance information corresponding to the integration application. As illustrated in FIG. 1, the GUI 100 may present the performance information 114(1)-(4) for the assets associated with the assets representations 104(1)-(4) of the flow representation 102. For example, as illustrated in FIG. 1, first performance information 114(1) may be presented with the first asset representation 104(1) to indicate performance metrics corresponding to the step of receiving an HTTP request at an HTTP endpoint, the second performance information 114(2) may be presented with the second asset representation 104(2) to indicate performance metrics corresponding to the step of selecting customer information from a database, and so forth.

Some examples of performance information include performance metrics indicating the amount of requests received over a predetermined period of time, the amount of responses sent over a predetermined period of time, processing rates of individual requests, processing rates of particular types of requests, response times to individual requests, response times to particular types of requests, a minimum processing time of a type of request, a maximum processing time of a type of request, a median processing time of a type of request, resource usage in terms of CPU and memory, success and/or failure rates of requests, operations, or execution paths, etc.

Additionally, the performance information 114 may include one or more graphical effects to communicate to a user the status of a process flow, process sub-flow, and/or asset. Some examples of graphical effects include a graphic scheme, color scheme (e.g., brightness intensity lightness, darkness), or graphic element. For instance, if a success rate is above average, the success rate value may be displayed using a first color (e.g., green) within the performance information 114. If a success rate is average, the success rate value may be displayed using a second color (e.g., yellow) within the performance information 114. If a success rate is below average, the success rate value may be displayed using a third color (e.g., red) within the performance information 114.

As such, a platform user may employ the management application to monitor the performance of an integration application. Further, the performance information 114 may be used to identify performance bottlenecks, performance irregularities, inefficient components, potential denial of services, and/or diagnose application performance issues. In addition, the platform user may enable logging functionality within the integration application in response to the performance information 114. For example, the platform user may identify a performance bottleneck at the asset corresponding to the asset representation 104(2). Further, the platform user may enable one or more log points associated with the asset corresponding to the asset representation 104(2). In addition, as described in detail with respect to FIG. 2, the user may review log information generated based on enabling the one or more log points.

Figure 2:
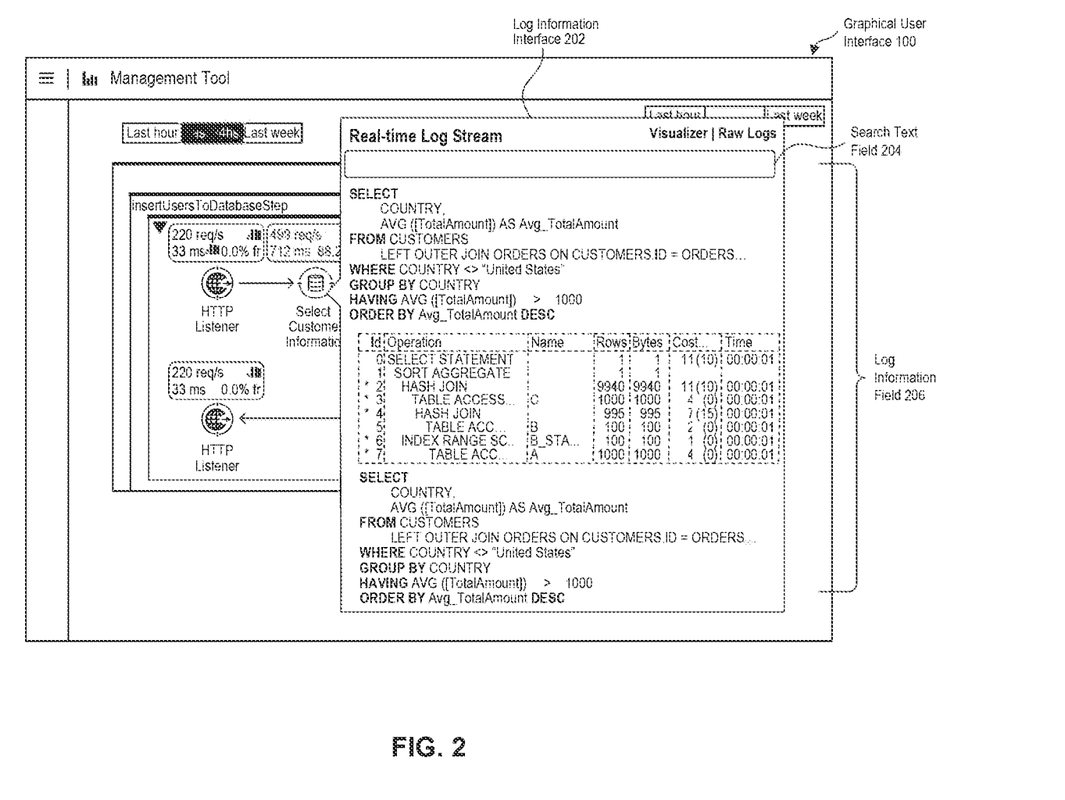
FIG. 2 illustrates an example graphical user interface of a management application for implementing dynamic codeless logging on an integration platform, according to some embodiments.

As illustrated in FIG. 2, the GUI 100 may further display a log information interface 202. In some embodiments, the log information interface 202 may be configured to display log information generated by the integration application. For instance, the log information interface 202 may display a stream of log information generated by the integration application. Further, the log information interface 202 may include a search text field 204 and log information field 206.

In some embodiments, the search text field 204 may be configured to receive text input from a platform user. Further, in response to the text input, the management application may search the log information generated by the integrated application for portions of the log information associated with the text input, and display the portions of the log information associated with the text input within the management application (e.g., the log information interface 202). For example, a user may search for debug output within the log information generated by the integration application. In some instances, the text input entered into the search text field 204 may include search operators (e.g., Boolean operators) for enhanced searching functionality.

Further, the log information field 206 may display log information generated by the integration application based at least in part on the log points enabled within the logging configuration interface 106. For example, the management application may instruct the integration application to log data corresponding to a log point based on a platform user enabling the log point within the log configuration interface 106. Further, the integration application may stream the generated log information to the management application, and the management application may present the generated log information within the log information field 206 of the log information interface 202. Additionally, or alternatively, the integration application may log the log information to a log file accessible by the management application, and the management application may present the log file within the log information field 206 of the log information interface 202.

In some embodiments, the log information interface 202 may be configured to display log information particular to an asset of an integration application. For instance, in some embodiments, a platform user may select an asset representation 104 via the GUI 100, and the GUI 100 may present the log information interface 202 in response to the selection. Additionally, the log information field 206 may display log information generated by the asset corresponding to the asset representation 104. For instance, the user may select the asset representation 104(2) via an input device (e.g., a mouse, a keyboard, touch screen interface, etc.) and present the log information interface 202 associated with the asset representation 104(2). In particular, the log information field 206 may display a stream of log data generated by the asset corresponding to the asset representation 104(2). Additionally, the search text input field 204 may be used to search the contents of log information presented within the log information field 206. As illustrated in FIG. 2, the log information field 206 may display a SQL Query string executed by the asset corresponding to the asset representation 104(2), and the results of the execution of SQL Query over the database associated with the asset corresponding to the asset representation 104(2).

FIGS. 3A-3D illustrate an example GUI 300 of an integration-application design tool for declaratively programming an integration application to implement dynamic codeless logging on an integration platform, according to embodiments of the present disclosure. In some embodiments, an integration-application design tool and a management application may be separate features of the same application. In some other embodiments, the integration-application design tool and the management application may be separate applications executing within the same computing environment or different computing environments.

Figure 3A:
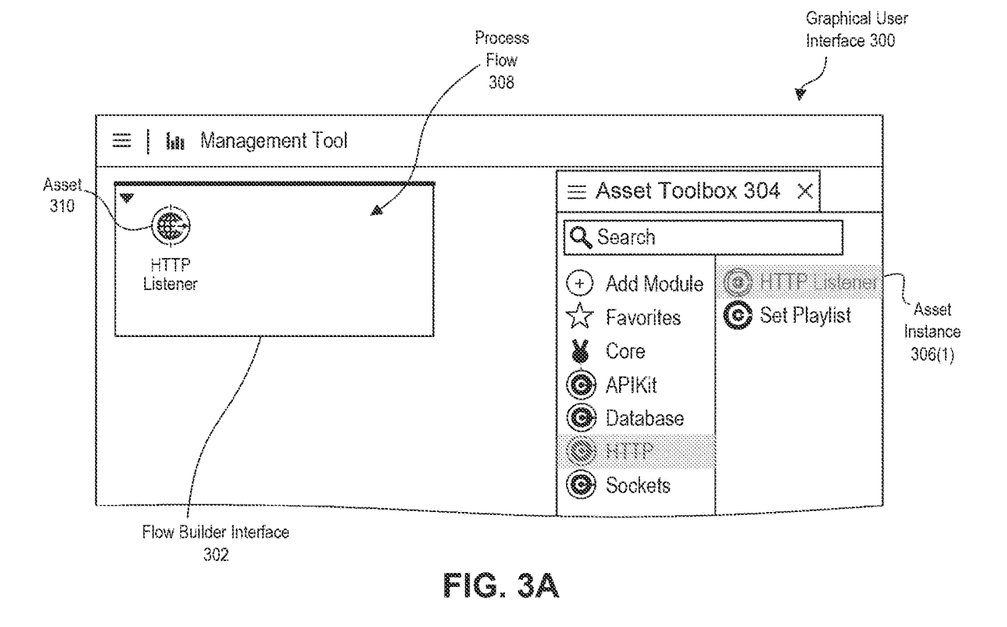
FIGS. 3A-3D illustrate an example graphical user interface of an integration-application design tool of an integration platform for declaratively programming an integration application to implement dynamic codeless logging on the integration platform, according to some embodiments.

As illustrated in FIG. 3A, the GUI 300 may include a flow builder interface 302 and asset toolbox 304 containing a plurality of different asset type instances 306(1)-(N). In some embodiments, a developer may declaratively program a process flow 308 of an integration application within the flow builder interface 302. As used herein, and in some embodiments, "declarative programming" may refer to software development via a point and click, drag and drop interfaces, configuration wizards, and/or declarative language input (e.g., eXtensible Markup Language (XML), YAML Ain't Markup Language (YAML), Extensible Application Markup Language (XAML), or any other markup languages) to text input forms. For example, the developer may add an asset instance 306(1) to the process flow 308 from the asset toolbox 304 as the asset 310, and provide a title for the asset 310 within the process flow 308. In some instances, the developer may drag and drop the asset instance 306(1) from the asset toolbox 304 to the flow builder interface 302. In some other instances, the developer may use a configuration wizard or menu to add the asset instance 306(1) to the process flow 308 being constructed within the flow builder interface 302. As illustrated in FIG. 3A, the asset 310 may be a HTTP endpoint (e.g., an HTTP listener) for receiving HTTP requests including a customer identifier.

As described in detail herein, the process flow 308 may include message sources and an arrangement of assets (e.g., the asset 310) that act as event-driven message processors. Further, the integration application may begin with processing a message received at an inbound message source of the process flow 308. In response to receipt of the message, the assets of the process flow 308 may be configured to receive a message and generate a response. In some embodiments, a message source may translate a particular communication protocol or method into a standard message format, which is then passed down to the assets of the process flow. Process flows may also use assets to make outbound client requests to other external resources, services, and/or applications.

Some examples of assets include connector assets, scope assets, component assets, transformer assets, filter assets, flow control assets, and error handling assets. Connector assets may be configured to create a direct connection between an integration application and an external resource (e.g., a database, a File Transfer Protocol server, etc.). Component assets may execute whenever a message is received. In some embodiments, a component asset may be a general component asset (e.g., logger component), a script component asset, or a web service component asset. Script component assets may facilitate Software as a Service (SaaS) integration by providing language-specific execution shells for performing custom-coded business logic. Web service component assets may provide a developer with a framework for referencing classes and API's needed by RESTful and SOAP Web services.

Scope assets may provide advanced processing, such as asynchronous invocations, polling, sub flows, etc. Transformer assets may be configured to translate data from a first format to a second format. Filter assets may be configured to determine how messages proceed thru a process flow. Flow control assets may be configured to route messages to other flows or an external service. Error handling assets may be configured to manage software exceptions that arise during processing of a message by a process flow.

Figure 3B:
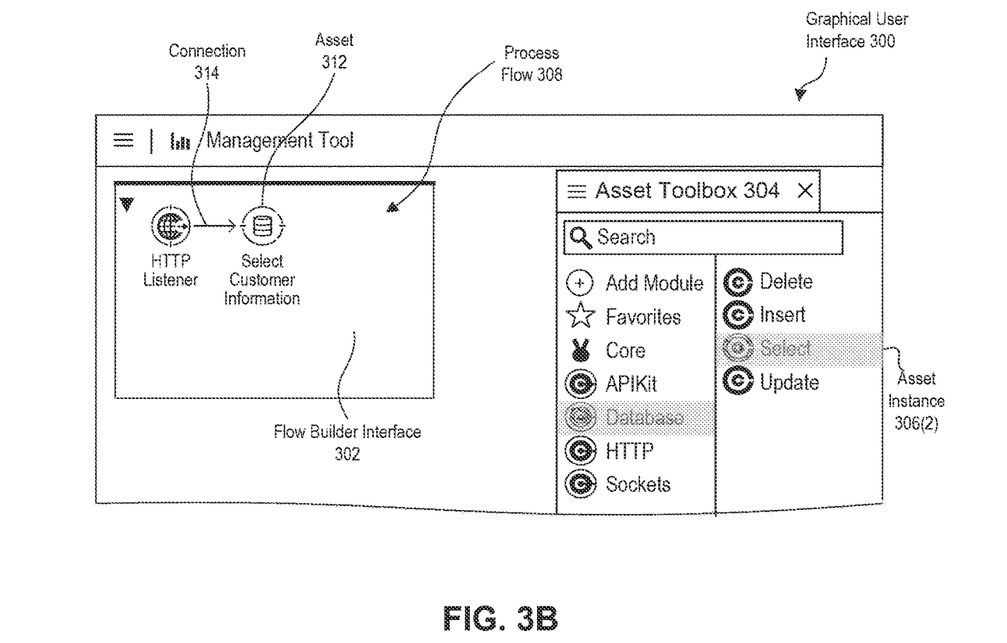

As illustrated in FIG. 3B, the developer may add an asset instance 306(2) to the process flow 308 from the asset toolbox 304 as the asset 312, and provide a title for the asset 312 within the process flow 308. In some instances, the developer may drag and drop the asset instance 306(2) from the asset toolbox 304 to the flow builder interface 302. In some other instances, the developer may use a configuration wizard or menu to add the asset instance 306(2) to the process flow 308 being constructed within the flow builder interface 302.

Upon receipt of the asset 312, the flow builder interface 302 may be configured to automatically create a connection 314 (i.e., message channel) between the asset 310 and the asset 312. Additionally, or alternatively, the integration-application design tool may provide a declarative interface for manually adding and/or configuring the connection 314 between the asset 310 and the asset 312. Further, the flow builder interface 302 may be configured to program the asset 310 to generate a message, and pass the message to the asset 312 for further processing. As further illustrated in FIG. 3B, the asset 312 may be a connector component configured to connect to an external database and query the external database for customer information using the customer identifier.

Figure 3C:
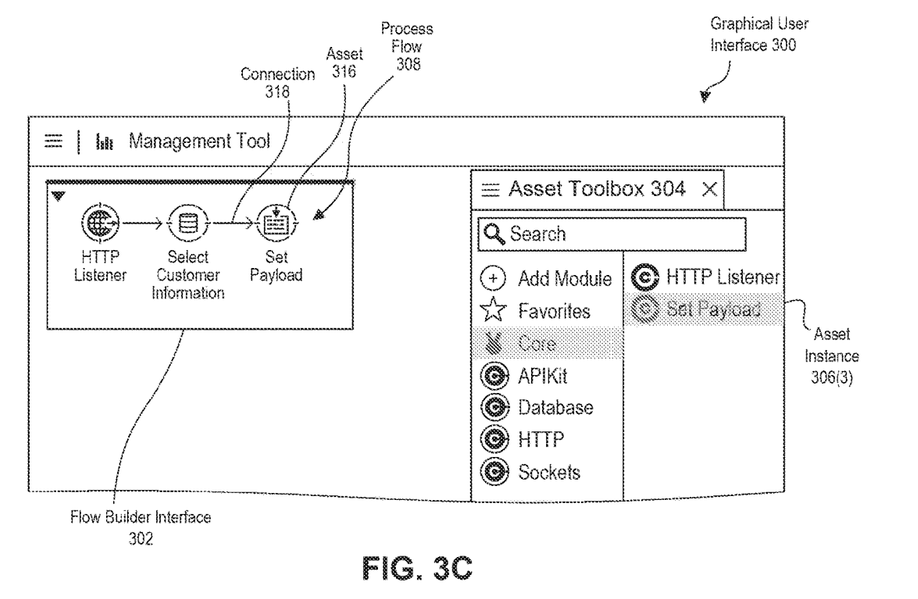

As illustrated in FIG. 3C, the developer may add an asset instance 306(3) to the process flow 308 from the asset toolbox 304 as the asset 316, and provide a title for the asset 316 within the process flow 308. In some instances, the developer may drag and drop the asset instance 306(3) from the asset toolbox 304 to the flow builder interface 302. In some other instances, the developer may use a configuration wizard or menu to add the asset instance 306(3) to the process flow 308 being constructed within the flow builder interface 302.

Upon receipt of the asset 316, the flow builder interface 302 may be configured to create a connection 318 between the asset 312 and the asset 316. Additionally, or alternatively, the integration-application design tool may provide a declarative interface for manually adding and/or configuring the connection 318 between the asset 312 and the asset 316. Further, the flow builder interface 302 may be configured to program the asset 312 to generate a message, and pass the message to the asset 316 via the connection 318 for further processing. As further illustrated in FIG. 3C, the asset 316 may be a set payload transformer component configured to set the payload of a generated message to the customer information corresponding to the customer identifier.

As described in detail herein, the individual assets (e.g., the assets 310, 312, 316) of the flow builder interface 302 may also automatically program the resulting integration application to log information pertaining to the operations performed by the assets, respectively. For instance, upon adding the asset 312 to the flow builder interface 302, the integration-application design tool may be configured to program the asset 312 to include functionality for generating log information associated with one or more log points. In some embodiments, the integration-application design tool may be configured to program the asset 312 with functionality for logging version information, usage information, user input information, input output (I/O) event information, application errors, application exceptions, application failures, application successes, debug information, or trace flow information.

Further, the integration-application design tool may determine an asset-type of the asset 312, and provide the asset with asset-type specific logging functionality. For example, the integration-application design tool may determine that the asset 312 is a database related asset, and program the asset 312 with functionality for logging database commands and/or operations (SQL operations and/or commands) performed by the asset 312, database parameters of a database associated with the asset 312, query results associated with queries performed by the asset 312, query plans associated with queries performed by the asset 312, query response times for queries performed by the asset 312, query traces for queries performed by the asset 312, or a database server status of a database associated with the asset 312.

By providing logging functionality within reusable declaratively-configurable assets, embodiments of the present disclosure provide an integration application with a novel, intuitive, efficient, and comprehensive system for logging application information. Additionally, the log information may be leveraged to improve the scalability, reliability, and/or efficiency of an integration application by identifying performance bottlenecks, unhandled errors, scaling and breaking points, unused code, and/or system dependencies via the log information.

Figure 3D:
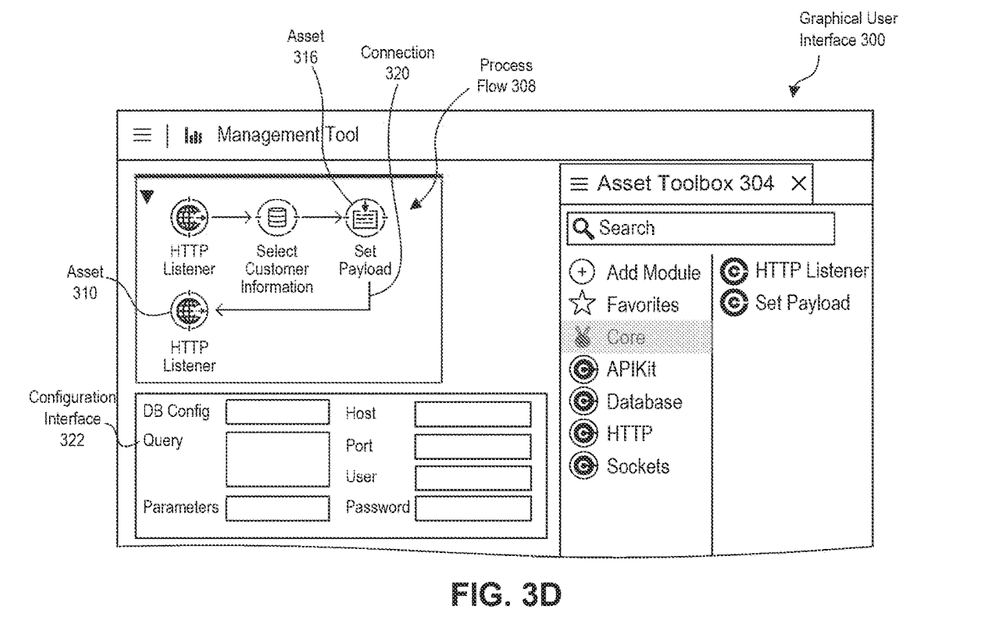

As illustrated in FIG. 3D, the user may employ the flow builder interface 302 to create a connection 320 between the asset 316 and the asset 310. Further, the flow builder interface 302 may be configured to program the asset 316 to generate a message, and pass the message to the asset 310 via the connection 320 for further processing. For example, the asset 316 may send a message to the asset 310 with a payload including customer information. In response, the asset 310 may send an HTTP response including the customer information to a requestor entity.

Further, the GUI 300 may include a configuration interface 322 for configuring the process flow 308. In some embodiments, the configuration interface 322 may be configured to accept declarative input from the developer with respect to the assets (e.g., the asset 310, the asset 312, and the asset 316), and/or the connections (e.g., the connection 314, the connection 318, and the connection 320) between the assets. For example, the configuration interface 322 may receive declarative input from a developer that configures the asset 312 to request particular fields of customer information based upon a message received from the asset 310. In some instances, the configuration interface 322 may present different configuration fields based upon the type of asset. For example, the configuration interface 322 may include input fields for a display name, query text, input parameters, and/or connector configuration information for a structured query language (SQL) connector asset.

In some embodiments, the integration-application design tool may generate a configuration file at least partially in response to declarative input to the flow builder interface 302 and other interfaces of the integration-application design tool. Additionally, or alternatively, the developer may design the integration application within the integration-application design tool by hand. Further, the integration-application design tool may generate the configuration file in one or more computer languages. Some examples computer languages include eXtensible Markup Language (XML), YAML Ain't Markup Language (YAML), RESTful API Modeling Language (RAML), DataWeave, JavaScript Object Notation (JSON), Bash, Python, Lua, Beanshell, JavaScript, Perl, Ruby, and Tcl, JavaScript, Hyper Text Markup Language (HTML), HTML5, BASIC, C, Lisp, Lua, Python, Ruby, Java, Groovy, C, C++, C #, Visual Basic, Objective-C, Rust, Scala, etc.

Once the developer has completed development of the integration application, the integration-application design tool may package the integration application into a deployable file. The deployable file may include application code, configuration files, and dependencies. In some embodiments, the integration-application design tool may package the integration application into a self-contained Java ARchive (JAR) file. Further, the deployable file may be deployed to a runtime environment to execute the integration application. In some embodiments, the deployable file may be deployed into a cloud environment or an on premises server.

Figure 4:
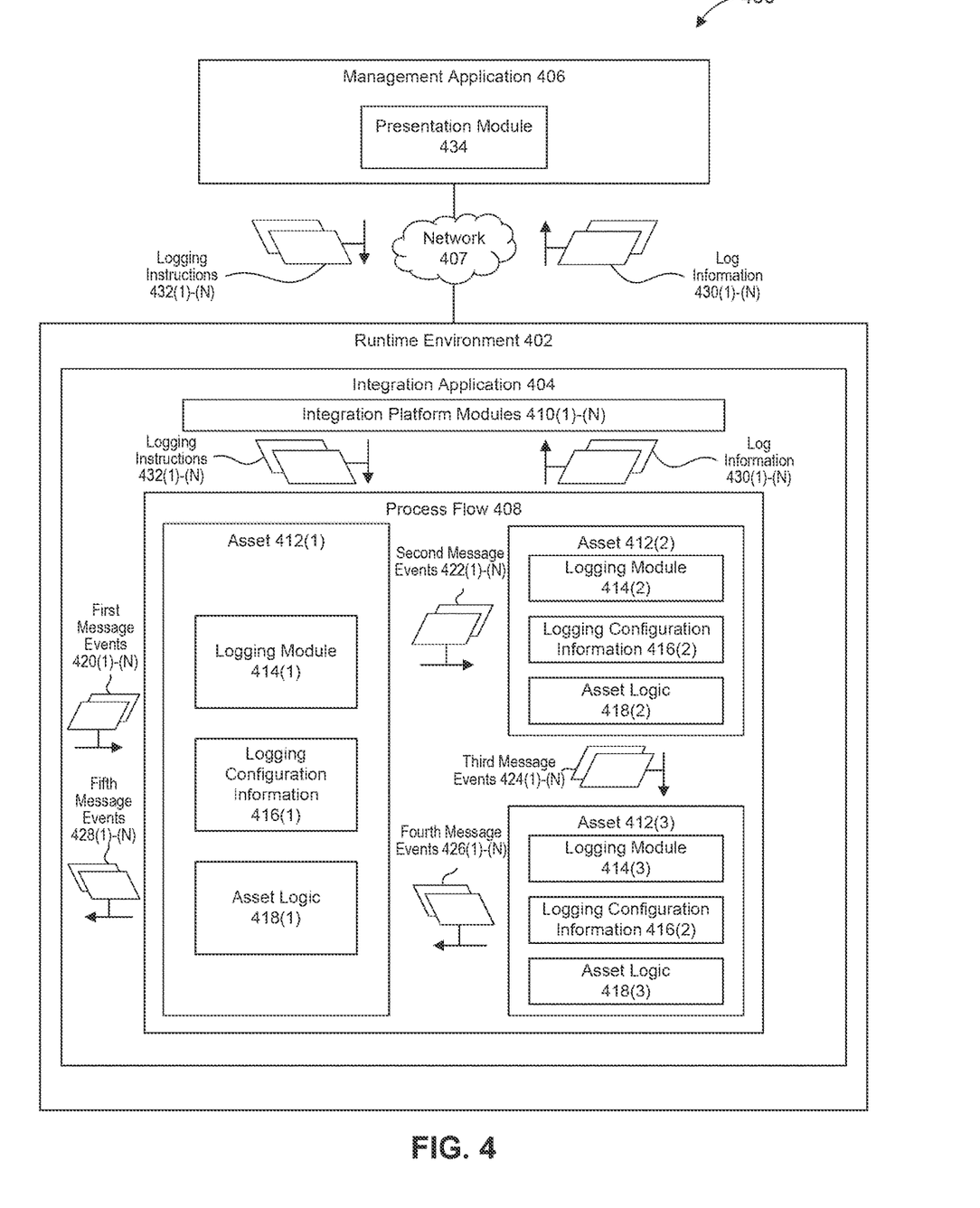
FIG. 4 is a block diagram of an example framework for implementing dynamic codeless logging in an integration platform system.

FIG. 4 is a block diagram of an example framework for implementing dynamic codeless in an integration platform system 400, according to some embodiments. As illustrated in FIG. 4, the integration platform system 400 includes a runtime environment 402 executing an integration application 404, and a management application 406. Further, the integration application 404 and the management application 406 may communicate via a communication network(s) 407. The communication network 407 may include any combination of a private network, personal area network (PAN), Local-Area Network (LAN), Wide-Area Network (WAN), or the Internet. Further, the connection between the integration application 404 or the management application 406, and the communication network 407 may be a wireless connection (e.g., Bluetooth or other short range wireless technology, cellular, Wi-Fi connection, etc.), or a wired connection (e.g., Ethernet, universal serial bus (USB), etc.), or a combination thereof.

The integration application 404 may include a process flow 408 and integration platform modules 410(1)-(N). As illustrated in FIG. 4, the process flow 408 may include a first asset 412(1), a second asset 412(2), and a third asset 412(3). Although assets 412(1)-(3) are shown in FIG. 4, the embodiments described herein are applicable to any number of assets 412. In some embodiments, the assets 412 may correspond to the assets 310, 312, and 316. Further, each of the assets 412 may include a logging module 414, logging configuration information 416, and/or asset logic 418. For example, the first asset 412(1) may include a first logging module 414(1), first logging configuration information 416(1), and first asset logic 418(1).

As described in detail herein, the process flow 408 may receive first message events 420(1)-(N) and provide the first message events 420(1)-(N) to the first asset 412(1) as requests. In response, the first asset 412(1) may process the first message events 420(1)-(N) via the asset logic 418(1) to generate second message events 422(1)-(N). For example, the first asset 412(1) may receive a first message event 420(1) (e.g., a HTTP request) with a payload including an identifier associated with a customer, and generates a second message event 422(1) including the identifier via the asset logic 418(1).

Further, the first asset 412(1) may forward the second message events 422(1)-(N) to the second asset 412(2). Upon receipt of the second message events 422(1)-(N), the second asset 412(2) may process the second message events 422(1)-(N) via the asset logic 418(2) to generate third message events 424(1)-(N). In addition, the second asset 412(2) may forward the third message events 424(1)-(N) to the third asset 412(3). For example, the asset 412(2) may receive the second message event 422(1), and query a customer database for customer information based on the identifier included in the second message event 422(1) via the asset logic 418(2). In addition, the second asset 412(2) may generate a third message event 424(1) including the customer information and send the third message event 424(1) to the third asset 412(3) via the asset logic 418(2).

Upon receipt of the third message events 424(1)-(N), the third asset 412(3) may process the third message events 424(1)-(N) via the asset logic 418(3) to generate fourth event messages 426(1)-(N). For example, the asset 412(3) may receive the third message event 424(1) and set the payload of a message to the customer information via the asset logic 418(3). For example, the asset logic 418(3) may cause the third asset 412(3) to generate a fourth event message 426(1) with a payload including the customer information, and send the message 426(1) to the first asset 412(1) Further, the first asset 412(1) may send a fifth event message 428(1) (e.g., a HTTP response) to the sender of the first event message 420(1) including the customer information.

In some examples, the logging modules 414(1)-(3) are components of the asset logic 418(1)-(3), respectively. In some other examples, the logging modules 414(1)-(3) are separate components from the asset logic 418(1)-(3). Additionally, the logging modules 414(1)-(3) may detect events associated with enabled or disabled log points associated with the assets 412(1)-(3), generate log information 430(1)-(N) corresponding to the detected events, and send the log information 430(1)-(N) to the integration platform modules 410(1)-(N). Further, the logging modules 414(1)-(3) may be further configured to implement an access control policy that encrypts portions of the logging information 430 using an encryption key associated with platform user authorized to view the portions of the logging information 430.

In some embodiments, the management application 406 may send logging instructions 432(1)-(N) to the logging modules 414(1)-(3) indicating whether to log a particular event in response to a platform user enabling or disabling a log point within a logging configuration interface (e.g., the logging configuration interface 106), as described with respect to FIG. 1. In response to receipt of the logging instructions 432(1)-(N), the logging modules 414(1)-(3) may log events associated with the logging instructions 432(1)-(N) as log information.

For example, the logging module 414(2) may log query results associated with queries performed by the asset logic 418(2) as log information 430(2) based on an logging instruction 432(2) received from the management application 406 in response to the enabling of a log point via the management application 406. Further, the logging module 414(2) may send the log information 430(2) to the integration platform modules 410(1)-(N), which may collect the log information 430(1)-(N) from the different logging modules 414(1)-(3) and send the log information 430(1)-(N) to the management application 406.

In some examples, a logging module 414 may inspect incoming messages based on the enabled log points associated with its corresponding asset 412. For instance, the logging configuration information 416(2) may indicate that a log point corresponding to logging SQL queries is enabled for the asset 412(2). As such, the logging module 414(2) may determine whether the second message events 422(1)-(N) include any information related to a request to perform a SQL query. If the logging module 414(2) determines that a second message event 422 includes information related to a request to perform a SQL query, the logging module 414(2) may log information related to the second message event 422(1) and/or operations performed by the asset logic 418(2) in response to the second message event 422(1).

Additionally, in some examples, a logging module 414 may inspect outgoing messages based on the enabled log points associated with its corresponding asset 412. For instance, the logging configuration information 416(2) may indicate that a log point corresponding to logging SQL query results is enabled for the asset 412(2). As such, the logging module 414(2) may determine whether the third message events 424(1)-(N) include any information related to results to a SQL query. If the logging module 414(2) determines that a third message event 422(1) includes information related to results to a SQL query, the logging module 414(2) may log information related to the third message event 424 and/or operations performed by the asset logic 414(2) with respect to the second message event 422(1).

In some embodiments, the logging configuration information 416 may include settings identifying the log points for the logging module 414 to log. In some instances, the logging configuration information 416 may be at least partially set during development of the process flow 408. For example, a developer may set the logging configuration information 416(2) via an integration-application design tool during development. Additionally, or alternatively, the integration application 404 and/or the management application 406 may dynamically update the logging configuration information 416 via the logging instructions 432(1)-(N). Further, as described in detail herein, the asset logic 418 may be at least partially determined by an integration-application design tool during development. For example, the asset logic 418(1)-(3) may be generated based at least in part on input to a flow builder interface (e.g., the flow builder interface 302) of an integration-application design tool during development.

Upon receipt of the log information 430(1)-(N), at least one of the integration platform modules 410(1)-(N) may send the log information 430(1)-(N) to the management application 406. In some embodiments, the integration platform modules 410 may stream the log information 430(1)-(N) to the management application 406. Additionally, or alternatively, the logging modules 414(1)-(3) may store the generated log information 430(1)-(N) in a log file, and the integration platform modules 410 may provide access to the log file. In some embodiments, the integration platform modules 410(1)-(N) may provide integration libraries and services (e.g., routing services, a message broker, transaction management, transportation management, security, transformation, etc.) to integration applications (e.g., the integration application 404) built on the integration platform.

Further, the management application 406 may be configured to present the log information 430(1)-(N) to a platform user via a presentation module 434. In some embodiments, the presentation module 434 may be configured to generate and display a GUI (e.g., the GUI 100) displaying graphical representation of the process flow 408 with the log information 430(1)-(N), as described with respect to FIG. 2.

In some embodiments, the integration application 404 and the management application 406 may execute on the same computing system. Additionally, or alternatively, in some instances, the management application 406 and an integration-application design tool may execute on the same system or within the same application. As such, the log information 430(1)-(N) may be presented with a declarative software development interface (e.g., GUI 100, flow builder interface 302, etc.). For example, a process flow depicted within the flow builder interface 302 may be displayed with log information 430(1)-(N) in order to provide a data driven development environment.

In some other embodiments, the runtime environment 402 and the management application 406 may execute on separate systems. For example, the integration application 404 may send the log information 430 to the management application 406 via the communications network 407.

Figure 5:
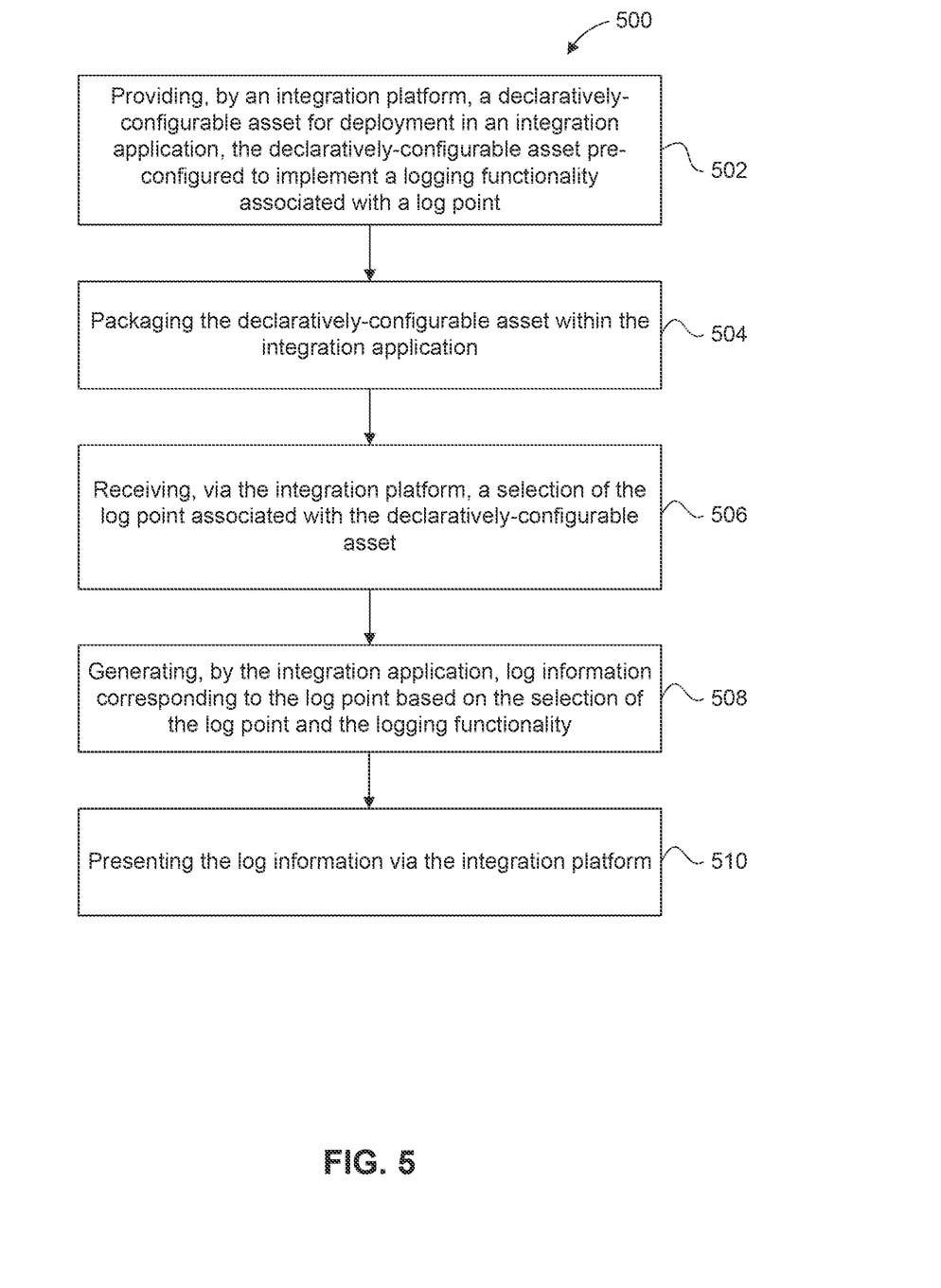
FIG. 5 is a flowchart illustrating a process for implementing dynamic codeless logging in an integration platform, according to some embodiments, according to some embodiments.

FIG. 5 is a flowchart illustrating a process for implementing dynamic codeless logging in an integration platform, according to some embodiments. Process 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, an integration platform may provide a declaratively-configurable asset for deployment in an integration application, the declaratively-configurable asset preconfigured to include a logging functionality associated with a log point. For example, an integration-application design tool may provide the asset toolbox 304 including an asset instance 306(2) that may be incorporated into the process flow 308 as the asset 312. As described herein, the asset 312 may be configured using declarative input from a developer. In addition, the asset 312 may include logging functionality (e.g., logging module 414(2)) for generating log information pertaining to operations performed by the asset 312. Further, the logging functionality may be configured to generate log information associated with a log point (e.g., the log points 108 and 112).

In 504, the integration-application design tool may package the declaratively-configurable asset into an integration application. For example, the integration-application design tool may be employed to add the asset 312 into the process flow 308 of an integration application. As a result, the asset 312 may be configured to receive, process, and send messages as an event processor within the process flow 308. In some instances, a developer may drag and drop the asset instance 306(2) from the asset toolbox 304 to the flow builder interface 302 to construct the process flow 308 to include the asset 312.

Additionally, the developer may employ the configuration interface 322 to provide declarative configuration information for the asset 312. For example, the developer may provide declarative statements and/or other configuration information via the configuration interface 322 to program the functionality of the asset 312 within the process flow 308. Further, the integration-application design tool may generate application code (e.g., a XML configuration file defining configurable attributes of the assets) based upon the process flow 308 and the input to the configuration interface 322. As a result of the addition of the asset 312 to the process flow 308, the asset 312 may be configured to receive, process, and send event messages as an event processor within the process flow 408 implemented by its corresponding integration application (e.g., the integration application 404).

In some embodiments, the integration-application design tool may configure the assets 310, 312, and 316 to generate log information via logging functionality (i.e., logging module 414(2)). For example, the integration-application design tool may determine a sequence of the process flow 308 based upon the ordering of the assets 310, 312, and 316 within the process flow 308. Further, the integration-application design tool may configure the assets 310, 312, and 316 to generate log information based on messages received from each other and messages sent to each other. As another example, the integration-application design tool may configure the assets 310, 312, and 316 to generate log information in response to logging instructions 432 received from the management application 406.

In 506, the integration platform may receive a selection of the log point associated with the declaratively-configurable asset. For example, a platform user may enable the general log point 108(1) within the logging configuration interface 106. Further, the integration application 404 may receive the logging instruction 432(1) from the management application 406 based on the platform user enabling the general log point 108(1). Further, the logging instruction 431(1) may instruct the asset 312(2) to log information 430(1) corresponding to the general log point 108(1).

In 508, the integration application may generate log information corresponding to the log point based on the selection of the log point and the logging functionality. In response to receipt of a logging instruction (e.g., the logging instruction 432(1)), the asset 312(2) may generate log information (e.g., the log information 430(1)) corresponding to the general log point 108(1). In some embodiments, the general log point 108(1) may correspond to logging generic application information about incoming and outgoing messages at the asset 312(2). As such, the asset 312(2) may generate log information upon receipt of a message from the asset 310 and transmission of a message to asset 316.

In 510, the integration platform may present the log information via the integration platform. For example, the management application 406 may present log information 430 via the presentation module 434. As illustrated in FIG. 2, the presentation module 434 may present a GUI (e.g., the GUI 100) configured to display a log information interface (e.g., the log information interface 202) including the log information 430 generated by the assets 412 of the integration application 404.

Figure 6:
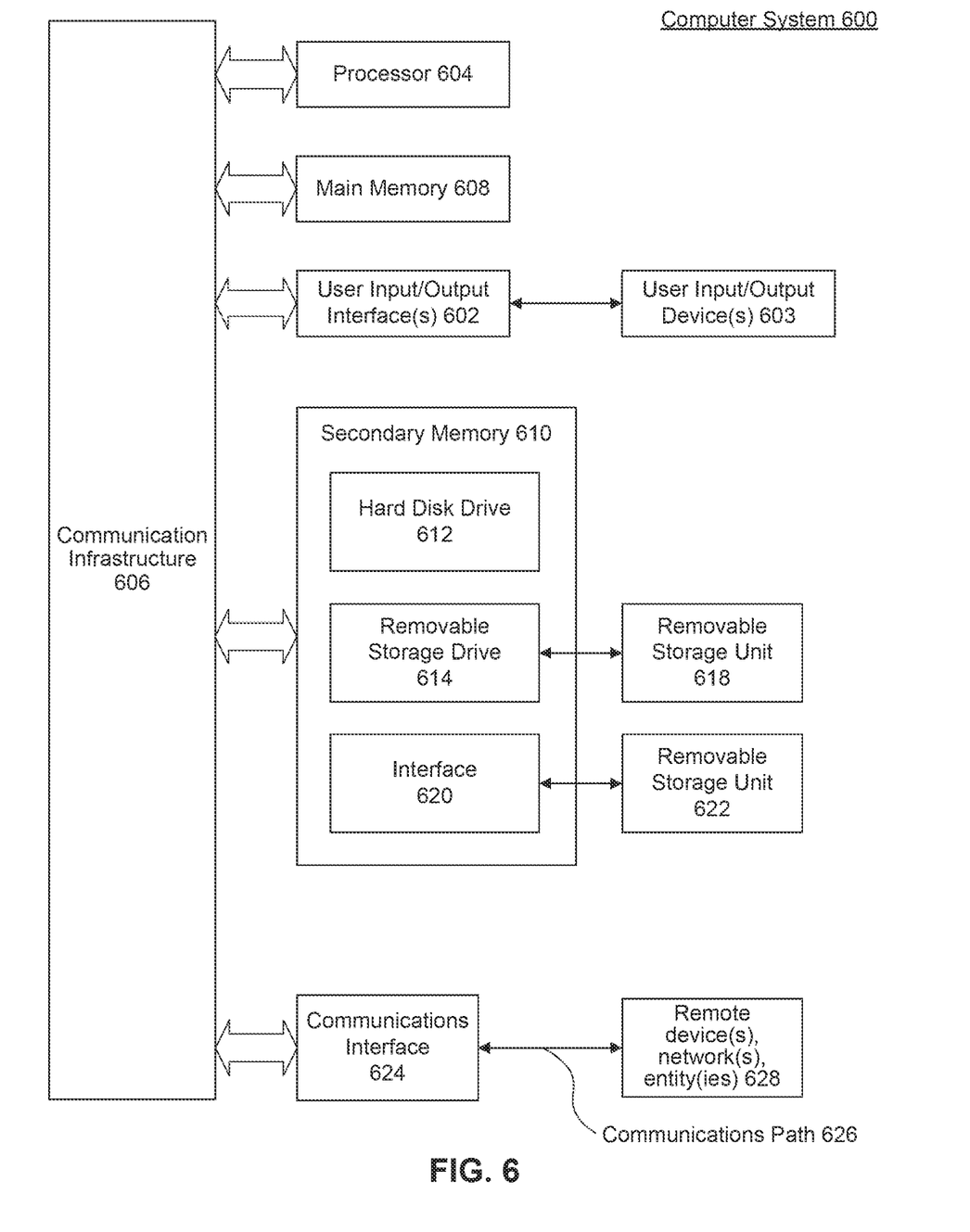
FIG. 6 illustrates a computer system, according to exemplary embodiments of the present disclosure.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 602, such as monitors, keyboards, pointing devices, etc., which may communicate with communication infrastructure or bus 606 through user input/output device(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

providing, by one or more computing devices, a declaratively-configurable asset for deployment in an integration application, the declaratively-configurable asset being pre-configured to implement a codeless logging functionality for generating log information corresponding to operations performed by the declaratively-configurable asset;

packaging, by the one or more computing devices, the declaratively-configurable asset within the integration application by adding the declaratively-configurable asset into a process flow of the integration application, wherein the integration application comprises one or more process flows and each process flow includes a plurality of declaratively-configurable assets;

receiving, via the one or more computing devices, during execution of the integration application, a selection of the declaratively-configurable asset within the packaged integration application;

generating, by the declaratively-configurable asset within the packaged integration application, log information during execution of the packaged integration application in a runtime environment, wherein the log information corresponds to the codeless logging functionality responsive to the selection of the declaratively-configurable asset; and presenting the log information via the one or more computing devices integration platform.

2. The method of claim 1, further comprising:

receiving, by the one or more computing devices, selection of a graphic representation of the declaratively-configurable asset during execution of the integration application;

receiving, by the one or more computing devices, a selection of a log point associated with the declaratively-configurable asset; and generating, by the one or more computing devices, log information corresponding to the log point based on the selection of the log point and the codeless logging functionality.

3. The method of claim 2, further comprising:

determining, by the one or more computing devices, the log point based on an asset-type associated with the declaratively-configurable asset; and presenting, by the one or more computing devices, the log point within a logging configuration interface.

4. The method of claim 1, further comprising:

receiving, by the one or more computing devices, selection of a log point associated with the declaratively-configurable asset;

sending, by the one or more computing devices, a logging instruction to the integration application, the logging instruction corresponding to the log point; and generating, by the integration application, log information corresponding to the tog point based on the togging instruction and the codeless logging functionality.

5. The method of claim 1, further comprising:
receiving, by the one or more computing devices, deselection of a log point associated with the declaratively-configurable asset;
sending, by the one or more computing devices, a logging instruction to the integration application, the togging instruction corresponding to the tog point; and
suspending, by the integration application, generation of log information corresponding to the log point based on the togging instruction.

6. The method of claim 1, wherein generating the log information corresponding to the codeless logging functionality associated with a log point, comprises:
receiving an event message via the declaratively-configurable asset;
determining that the event message is associated with the log point; and
logging application activity corresponding to the event message.

7. The method of claim 1, wherein generating the log information corresponding to the codeless logging functionality, comprises:
generating an event message via the declaratively-configurable asset;
determining that the event message is associated with a log point; and logging application activity corresponding to the event message.

8. A system, comprising:
a memory; and
at least one processor coupled to the memory and configured to:
provide a declaratively-configurable asset in an integration-application design tool, the declaratively-configurable asset being preconfigured to implement a codeless logging functionality for generating log information corresponding to operations performed by the declaratively-configurable asset;
package, at least partially via the integration-application design tool, the declaratively-configurable asset within an integration application by adding the declaratively-configurable asset into a process flow of the integration application, wherein the integration application comprises one or more process flows and each process flow includes a plurality of declaratively-configurable assets;
receive, during execution of the integration application, a selection of the declaratively-configurable asset within the packaged integration application;
generate, by the declaratively-configurable asset within the packaged integration application, log information during execution of the packaged integration application in a runtime environment, wherein the log information corresponds to the codeless logging functionality responsive to the selection of the declaratively-configurable asset; and
present the log information via an integration platform.

9. The system of claim 8, wherein the at least one processor is further configured to:
receive deselection of a tog point associated with the declaratively-configurable asset; and
suspend generation of log information corresponding to the log point based on the deselection.

10. The system of claim 9, wherein to generate the log information corresponding to the codeless logging functionality, the at least one processor is further configured to:
receive an event message via the declaratively-configurable asset;
determine that the event message is associated with a log point; and
log application activity corresponding to the event message.

11. The system of claim 9, wherein to generate the log information corresponding to the codeless logging functionality, the at least one processor is further configured to:
generate an event message via the declaratively-configurable asset;
determine that the event message is associated with a log point; and
log application activity corresponding to the event message.

12. The system of claim 8, wherein the declaratively-configurable asset is associated with a tog point and the log point corresponds to enabling logging of at least one of version information, usage information, user input information, input output (I/O) event information, application errors, application exceptions, application failures, application successes, debug information, or trace flow information.

13. The system of claim 8, wherein the declaratively-configurable asset is associated with a log point and the log point corresponds to enabling logging of at least one of a database command performed by the declaratively-configurable asset, a database parameter of a database associated with the declaratively-configurable asset, a query plan associated with a query performed by the declaratively-configurable asset, a query result associated with the declaratively-configurable asset, a query response time for a query performed by the declaratively-configurable asset, a query trace for a query performed by the declaratively-configurable asset, or a database server status of a database associated with the declaratively-configurable asset.

14. The system of claim 8, wherein the declaratively-configurable asset includes at least one of a connector asset, scope asset, component asset, transformer asset, filter asset, flow control asset, or error handling asset.

15. A non-transitory computer-readable device having instructions stored thereon that, when executed by at least one computing device, causes the at least one computing device to perform operations comprising:
providing, a declaratively-configurable asset for deployment in an integration application, the declaratively-configurable asset being preconfigured to implement a codeless logging functionality for generating log information corresponding to operations performed by the declaratively-configurable asset;
packaging the declaratively-configurable asset within the integration application by adding the declaratively-configurable asset into a process flow of the integration application, wherein the integration application comprises one or more process flows and each process flow includes a plurality of declaratively-configurable assets;
receiving, during execution of the integration application, a selection of the declaratively-configurable asset within the packaged integration application;
generating, by the declaratively-configurable asset within the packaged integration application, tog information during execution of the packaged integration application in a runtime environment, wherein the log information corresponds to the codeless logging functionality responsive to the selection of the declaratively-configurable asset; and
presenting the log information via an integration platform.

16. The non-transitory computer-readable device of claim 15, the operations further comprise:
- receiving selection of a graphic representation of the declaratively-configurable asset within the integration platform during execution of the integration application;
- receiving a selection of a log point associated with the declaratively-configurable asset; and
- generating log information corresponding to the log point based on the selection of the log point and the logging functionality.

17. The non-transitory computer-readable device of claim 16, wherein generating the log information corresponding to the codeless logging functionality, comprises:
- receiving an event message via the declaratively-configurable asset;
- determining that the event message is associated with a log point; and
- logging application activity corresponding to the event message.

18. The non-transitory computer-readable device of claim 15, the operations further comprise:
- receiving deselection of a log point associated with the declaratively-configurable asset;
- sending a logging instruction to the integration application, the logging instruction corresponding to the log point; and
- suspending, by the integration application, generation of log information corresponding to the log point based on the logging instruction.

19. The non-transitory computer-readable device of claim 15, wherein generating the log information corresponding to the codeless logging functionality associated with a tog point, comprises:
- receiving an event message via the declaratively-configurable asset;
- determining that the event message is associated with the log point; and
- logging application activity corresponding to the event message.

20. The non-transitory computer-readable device of claim 15, wherein the operations further comprise:
- receiving selection of a log point associated with the declaratively-configurable asset;
- sending a logging instruction to the integration application, the logging instruction corresponding to the log point; and
- generating, by the integration application, log information corresponding to the log point based on the logging instruction and the codeless logging functionality.

\* \* \* \* \*